US012119495B2

(12) United States Patent
Hauth

(10) Patent No.: US 12,119,495 B2
(45) Date of Patent: Oct. 15, 2024

(54) ELECTRIC BATTERIES AND METHODS FOR PRODUCING THE SAME

(71) Applicant: Brady Hauth, Salt Lake City, UT (US)

(72) Inventor: Brady Hauth, Salt Lake City, UT (US)

(73) Assignee: Brady Houth

( * ) Notice: Subject to any disclaimer, the term of this patent is extended or adjusted under 35 U.S.C. 154(b) by 247 days.

(21) Appl. No.: 17/354,039

(22) Filed: Jun. 22, 2021

(65) Prior Publication Data
US 2022/0407073 A1    Dec. 22, 2022

(51) Int. Cl.
| H01M 4/62 | (2006.01) |
| H01M 4/02 | (2006.01) |
| H01M 4/38 | (2006.01) |
| H01M 4/583 | (2010.01) |

(52) U.S. Cl.
CPC ............ *H01M 4/62* (2013.01); *H01M 4/38* (2013.01); *H01M 4/583* (2013.01); *H01M 2004/027* (2013.01); *H01M 2300/0037* (2013.01)

(58) Field of Classification Search
None
See application file for complete search history.

(56) References Cited

U.S. PATENT DOCUMENTS

| 2,191,574 | A |  | 2/1940 | Martin et al. | |
| 6,403,255 | B1 | * | 6/2002 | Gofer | H01M 4/60 |
| | | | | | 429/213 |
| 2012/0171577 | A1 | * | 7/2012 | Ryu | H01M 4/38 |
| | | | | | 429/339 |
| 2014/0170511 | A1 |  | 6/2014 | Tolmachev et al. | |

FOREIGN PATENT DOCUMENTS

| EP | 1 380 569 B1 | * | 2/2013 |
| JP | 2000-340258 | * | 12/2000 |
| JP | 2005-149982 | * | 6/2005 |
| JP | 2005-209524 | * | 8/2005 |

OTHER PUBLICATIONS

Machine translation of JP2005-149982, published on Jun. 9, 2005 (Year: 2005).*
Machine translation of JP2000-340258, published on Dec. 8, 2000 (Year: 2000).*
Machine translation of JP2005-209524, published on Aug. 4, 2005 (Year: 2005).*
Brady Hauth, Electric batteries and methods for producing the same (U.S. Appl. No. 63/043,092), USPTO, Jun. 23, 2020.
Jin Han et al, Fluorine-free Water-in-Salt Electrolyte for Green and Low-cost Aqueous Sodium-Ion Batteries, ChemSusChem, 2018, 3704-3707, 11.
Yuriy Tolmachev et al, Energy cycle based on a high specific energy aqueous flow battery and its potential use for fully electric vehicles and for direct solar-to-chemical energy conversion, J. Solid State Electrochemistry, 2015, 2711-2722, 19.
Fei Ding, Dendrite-Free Lithium Deposition via Self-Healing Electrostatic Shield Mechanism, J. Am. Chem. Soc., 2013, 4450-4456, 135.
Mikhail Petrov, Electrochemically driven evolution of Br-containing aqueous solution composition, Journal of Electroanalytical Chemistry, 2019, 125-133, 836.
Yusuke Morikawa et al, Reversible and High-rate Hard Carbon Negative Electrodes in a Fluorine-free Sodium-salt Electrolyte, Electrochemistry, 2020, 151-156, 88.
"Primarily definition." Law Insider, May 2021, https://web.archive.org/web/20210528200825/https://www.lawinsider.com/dictionary/primarily.
"Mainly definition." Law Insider, Sep. 2023, https://web.archive.org/web/20230920003322/https://www.lawinsider.com/dictionary/mainly.

* cited by examiner

*Primary Examiner* — Anca Eoff

(57) ABSTRACT

Electric batteries are provided wherein the positively charged electrode contacts an aqueous layer containing material which is reduced during electric discharge and/or metal ions are transported through special electrolyte that inhibits dendritic deposition on the negatively charged electrode. Methods described include electrolyte compositions including organoborate anions and cations with low charge density, and aqueous solutions containing bromate and/or bromide anions and high concentrations of dissolved salts.

19 Claims, 2 Drawing Sheets

ELECTRIC BATTERIES AND METHODS FOR PRODUCING THE SAME

FIELD

The field relates to systems and methods for conversion between electrical energy and chemical potential energy, and more particularly to rechargeable electric battery systems.

BACKGROUND

Rechargeable electric batteries are widely used for many applications, such as portable electronic devices, handheld power tools, electric automobiles, and starting internal combustion engines. Currently, the most-used types of rechargeable electric battery are lead-acid batteries and lithium-ion batteries. Lead-acid batteries have low specific energy, degrade quickly when their full capacity is used repeatedly, and contain toxic materials. Lithium-ion batteries are expensive to produce, require elements with relatively limited availability, and often have unsatisfactory cycle lifetimes.

BRIEF SUMMARY OF THE INVENTION

The technical problem which the present invention relates to is storage of electrical energy. The present invention solves this problem by means of electrochemical cells using novel combinations of materials, as described in the claims.

Advantageous effects of the present invention include making possible the manufacturing of rechargeable electric batteries with improved combinations of production cost, cycle lifetime, specific power, and specific energy.

DETAILED DESCRIPTION OF THE INVENTION

Figure 1:
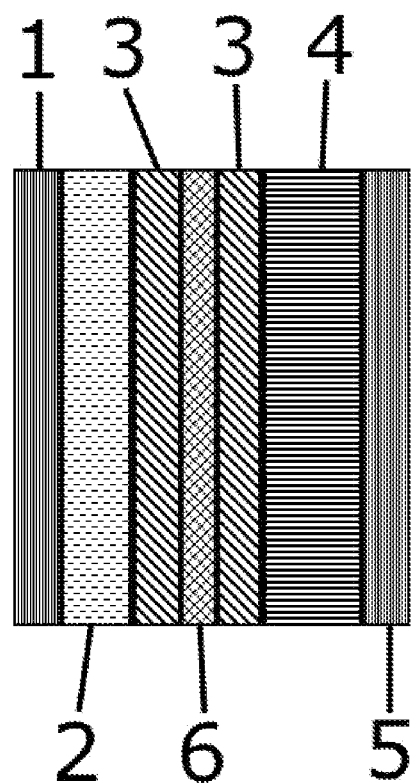
FIG. 1 is a cross-section of a fully charged electric battery.

The present invention is not limited to the construction details or component arrangements described in the following description or illustrated in the drawings. Other embodiments of the present invention are possible.

Turning to FIG. 1, a charged electric battery has a negative electrode substrate 1 and a layer of active material 2, which together form a negatively charged electrode. Said negative electrode substrate may consist of metallic magnesium. Said active material consists of metallic lithium, metallic sodium, metallic potassium, metallic magnesium, and/or metallic calcium, and comprises at least 2% of the negatively charged electrode by mass when the battery is fully charged. In one embodiment, said negatively charged electrode consists of metallic magnesium with metallic sodium and/or metallic potassium deposited on it. As the electric battery is discharged, active material leaves layer 2 and enters the electrolyte 3, which contains active material ions, organoborate ions which may include tetraphenylborate or tetrakis (trifluoromethyl) borate ions, and one or more organic compounds. Said organic compounds present in the electrolyte 3 may include 2-methyltetrahydrofuran, tetrahydrofuran, tetrahydropyran, 4-methyltetrahydropyran, 1,2-dimethoxyethane, 1,3-dimethoxypropane, and/or other ether compounds. The electrolyte 3 may further contain potassium, caesium, rubidium, and/or quaternary ammonium ions with a total concentration that is at least 0.1 mM. Addition of cations with higher electrochemical potential and lower charge density than the primary active material serves to inhibit dendritic deposition of active material on the negative electrode. In one embodiment, potassium cations act to inhibit dendritic deposition of sodium metal.

An aqueous layer 4 contains water, a redox salt pair which is interconverted during charging and discharging, other dissolved salts which serve to reduce solubility of water in the electrolyte 3, and optional buffer salt pairs which serve to maintain the pH and/or free water content of the aqueous layer. Some salts in the aqueous layer 4 may be present as solid particles. Said redox salt pair may be a bromate and a bromide. Said other dissolved salts may include lithium acetate, sodium acetate, potassium acetate, caesium acetate, lithium chloride, lithium bromide, calcium chloride, calcium bromide, lithium hydroxide, sodium hydroxide, lithium sulfate, and/or sodium sulfate. In one embodiment, said other dissolved salts are potassium acetate and sodium acetate. In another embodiment, said other dissolved salts are sodium hydroxide and lithium hydroxide. Salts used in said buffer salt pairs may include borate salts, calcium hydroxide, calcium acetate, and/or calcium acetate monohydrate. Said redox salt pair and buffer salt pairs may include solid particles, which may include borate salts, calcium hydroxide, calcium acetate, potassium bromate, sodium bromate, other bromate salts, and/or solid hydrates of the aforementioned salts. In one embodiment, calcium hydroxide and calcium acetate monohydrate are used as a buffer salt pair, and calcium hydroxide, an acetate salt of active material, and a bromide salt are jointly converted to or from calcium acetate monohydrate, metallic active material, and a bromate salt as the battery is charged or discharged.

A positively charged electrode 5 interacts with the aqueous layer 4 electrochemically. The positively charged electrode 5 may consist of graphite or metal coated with a layer of carbon.

A separator 6 prevents direct contact between the negative electrode substrate 1 and sodium metal 2 on one side, and the aqueous layer 4 and positively charged electrode 5 on the other side. Said separator may consist of a polymer sheet which is gelled by the electrolyte 3, a polymer mesh, and/or a polymer sheet with small holes. In one embodiment, the separator consists of a sheet of poly (tetrahydrofuran).

Figure 2:
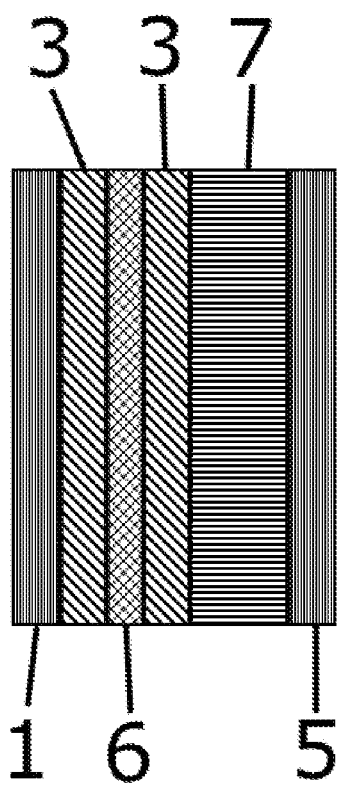
FIG. 2 is a cross-section of a fully discharged electric battery.

Turning to FIG. 2, a fully discharged electric battery has the same layer of negative electrode substrate 1 but the layer of active material 2 is no longer present. The aqueous layer 7 of the fully discharged electric battery contains water, a salt which can be oxidized, a salt formed by migration of active material from the active material layer 2, and other salts which serve to reduce solubility of water in the electrolyte 3. Some salts in the aqueous layer 7 may be present as solid particles. In one embodiment, the salt formed by migration of active material from the active material layer 2 is sodium acetate. The salt which can be oxidized may be a bromide, which can be oxidized to a bromate as the electric battery is charged.

What is claimed is:

1. An electric battery comprising in order: a negatively charged electrode, an electrolyte which directly contacts said negatively charged electrode, optional additional layers, and a positively charged electrode, wherein said negatively charged electrode contains at least 2% metallic sodium and/or metallic potassium by mass when the electric battery is fully charged which is active material that migrates towards the positively charged electrode as the electric battery is discharged, and wherein said electrolyte contains at least 100 µM of cations with lower charge density than cations of said active material, and wherein said electrolyte contains dissolved anions which are at least 50% organoborate anions by mass.

2. The electric battery of claim 1 wherein said anions include tetrakis(trifluoromethyl) borate and/or tetraphenylborate.

3. The electric battery of claim 1 wherein said cations with lower charge density than cations of said active material are one or more cations which have lower charge density than cations of said active material selected from the group consisting of potassium (I), caesium (I), rubidium (I), and quaternary ammonium cations.

4. The electric battery of claim 1 wherein said electrolyte consists of one or more salts dissolved in ether compounds.

5. The electric battery of claim 4 wherein said ether compounds include 2-methyltetrahydrofuran and/or 1,3-dimethoxypropane.

6. An electric battery comprising in order: a negatively charged electrode, optional additional layers, an electrolyte containing organic compounds, optional additional layers, an aqueous layer containing material which is oxidized as the electric battery is charged and reduced as the electric battery is discharged and further containing one or more dissolved salts which have high solubility in water and act to reduce solubility of water in an electrolyte layer of the electric battery, optional additional layers, and a positively charged electrode.

7. The electric battery of claim 6 wherein said aqueous layer contains bromate ions when said electric battery is in a fully charged state and wherein said bromate ions are at least partially reduced to bromide ions when said electric battery is in a fully discharged state.

8. The electric battery of claim 7 wherein said organic compounds in said electrolyte consist of one or more ether compounds and one or more salts.

9. The electric battery of claim 8 wherein said ether compounds include 2-methyltetrahydrofuran, tetrahydrofuran, tetrahydropyran, 4-methyltetrahydropyran, 1,2-dimethoxyethane, and/or 1,3-dimethoxypropane.

10. The electric battery of claim 7 wherein said positively charged electrode consists of graphite or an electrically conductive material coated with a carbonaceous layer.

11. The electric battery of claim 6 wherein said dissolved salt present in said aqueous layer consists of at least 50% lithium acetate, sodium acetate, potassium acetate, caesium acetate, lithium chloride, lithium bromide, calcium chloride, calcium bromide, lithium hydroxide, sodium hydroxide, lithium sulfate, and/or sodium sulfate by mass.

12. The electric battery of claim 11 wherein said dissolved salt consists of at least 50% lithium acetate, potassium acetate, sodium acetate, and/or caesium acetate by mass.

13. The electric battery of claim 12 wherein said aqueous layer further contains solid particles of calcium acetate, potassium bromate, sodium bromate, and/or solid hydrates of the aforementioned salts.

14. The electric battery of claim 6 wherein said electrolyte contains at least 100 µM of potassium (I), caesium (I), rubidium (I), and/or quaternary ammonium cations.

15. The electric battery of claim 14 wherein the negatively charged electrode consists of metallic sodium deposited on a negative electrode substrate when the battery is charged.

16. The electric battery of claim 15 wherein said negative electrode substrate consists of metallic magnesium.

17. The electric battery of claim 6 wherein said electrolyte contains dissolved anions which are at least 50% organoborate anions by mass.

18. The electric battery of claim 6 wherein said aqueous layer contains solid particles of one or more bromate salts.

19. The electric battery of claim 6 wherein said aqueous layer contains solid particles of calcium hydroxide in its fully discharged state, and wherein said calcium hydroxide is converted to calcium acetate and/or calcium acetate monohydrate as the battery is charged.

* * * * *

UNITED STATES PATENT AND TRADEMARK OFFICE
CERTIFICATE OF CORRECTION

| | |
|---|---|
| PATENT NO. | : 12,119,495 B2 |
| APPLICATION NO. | : 17/354039 |
| DATED | : October 15, 2024 |
| INVENTOR(S) | : Brady Hauth |

Page 1 of 1

It is certified that error appears in the above-identified patent and that said Letters Patent is hereby corrected as shown below:

On the Title Page

Item [73], Please correct the assignee to "Brady Hauth".

Signed and Sealed this
Nineteenth Day of November, 2024

Katherine Kelly Vidal
*Director of the United States Patent and Trademark Office*